J. W. HEDENBERG.
Bale-Ties.

No. 137,549.

Patented April 8, 1873.

Witnesses.
Geo. L. Chafin
Palen Schmit

Inventor.
John W. Hedenberg

UNITED STATES PATENT OFFICE.

JOHN W. HEDENBERG, OF CHICAGO, ILLINOIS.

IMPROVEMENT IN BALE-TIES.

Specification forming part of Letters Patent No. 137,549, dated April 8, 1873; application filed February 19, 1873.

*To all whom it may concern:*

Be it known that I, JOHN W. HEDENBERG, of Chicago, in the county of Cook and State of Illinois, have made a new and useful Improvement in Baling-Ties, of which the following is a specification:

The present invention relates to that class of ties which are used in baling cotton; and its nature consists in the novel construction of the metal loop which is combined with the strap-iron which passes around the bale, it being provided with a prong for holding the strap in the place when the bale is under pressure, as when a large number of bales are packed together, and as when the bale is under pressure before it leaves the press, as the whole is hereinafter fully described and shown.

Figure 1:
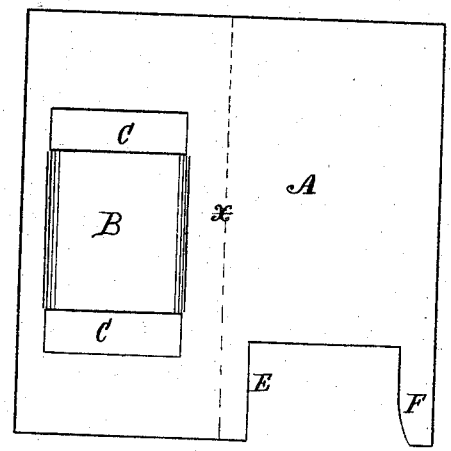
Figure 2:
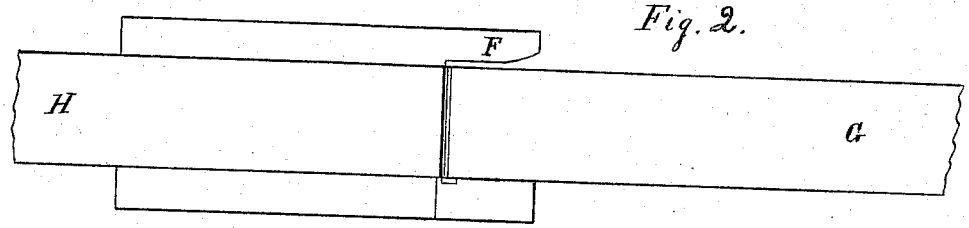
Figure 3:
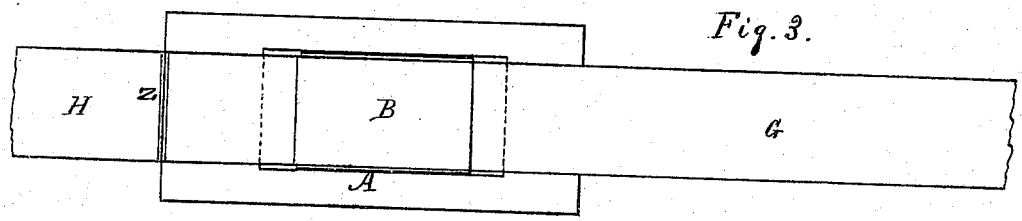
Figure 4:
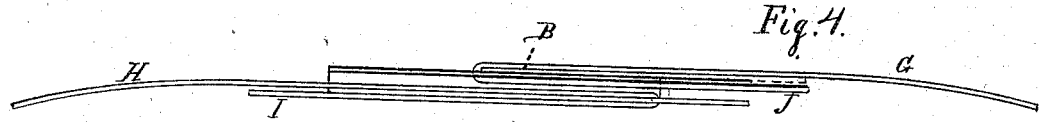

In the drawing, Figure 1 is a plan view of the looped plate as it is cut from the sheet-metal; Fig. 2, an inside view of the tie locked together as when fastened round a cotton-bale; Fig. 3, an outside view of the tie also locked together; Fig. 4, an edge view of the tie.

A represents a sheet of thin metal cut away at E to form a prong, F, to hold the under strap H in place until the bale leaves the press and expands, and to prevent the strap from getting out of place when one bale is under the pressure of several other bales, as when the cotton is being transported, in which case large quantities are pressed together to economize space—as, for instance, on shipboard; and a loop, B, is formed by dies to form a lock for the other end G of the strap, holes C being cut through the plate A for that purpose. The plate A is then folded on the dotted line X, so that its sides will be parallel to each other, after which the straps are locked, as follows: A strip of suitable band-iron is brought around the cotton bale when it is in press, and one end, represented at G, is put through the loop B, and the extreme end J is brought back between the two thicknesses of the plate A, or the end G J can be put into the loop B at the factory before shipment; the other end is then bent over, as at H I, and placed in the recess E, so the prong F will hold it in place. In Figs. 2 and 3 the end G is doubled over the end of the plate A at Z, and then put through the loop B; but at Fig. 4 it is put through the loop directly; either method will answer, but I prefer the method shown in Figs. 2 and 3.

Having described my improvement, what I claim as new is—

A plate, A, constructed with the raised loop B, notch E, and prong F, in the form described, and combined with a suitable strap, G H, to form a bale-tie, as set forth.

JOHN W. HEDENBERG.

Witnesses:
G. L. CHAPIN,
PALEN SCHMIT.